(12) United States Patent
Lanzi (10) Patent No.: US 12,515,897 B2
(45) Date of Patent: Jan. 6, 2026

(54) PALLETIZING DEVICE OF A SLIDING TABLE WITH ROLLER BLOCKING SYSTEM

(71) Applicant: SIDEL PARTICIPATIONS, Octeville-sur-Mer (FR)

(72) Inventor: Mauro Lanzi, Parma (IT)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/718,865

(22) PCT Filed: Dec. 13, 2022

(86) PCT No.: PCT/EP2022/085560
§ 371 (c)(1),
(2) Date: Jun. 12, 2024

(87) PCT Pub. No.: WO2023/110834
PCT Pub. Date: Jun. 22, 2023

(65) Prior Publication Data
US 2025/0051108 A1    Feb. 13, 2025

(30) Foreign Application Priority Data
Dec. 13, 2021   (EP) .................................. 21214143

(51) Int. Cl.
*B65G 57/06*   (2006.01)
*B65G 57/24*   (2006.01)

(52) U.S. Cl.
CPC ............. *B65G 57/06* (2013.01); *B65G 57/24* (2013.01)

(58) Field of Classification Search
CPC ...... B65G 57/06; B65G 57/24; B65G 25/065; B65G 13/065; B65G 39/02; B65G 13/11;
(Continued)

(56) References Cited

U.S. PATENT DOCUMENTS

| 2,194,219 | A  | * | 3/1940 | Eggleston | ............ | B65G 13/075 |
| | | | | | | 193/35 A |
| 7,950,896 | B2 | * | 5/2011 | Scholtes | ................ | B65G 57/06 |
| | | | | | | 414/792.8 |

(Continued)

FOREIGN PATENT DOCUMENTS

EP    2964552 B1    11/2016

OTHER PUBLICATIONS

International Search Report dated Mar. 14, 2023 for PCT/EP2022/085560.

*Primary Examiner* — Lynn E Schwenning
(74) *Attorney, Agent, or Firm* — Blake T. Hudson; Stephanie Davy-Jow (57) ABSTRACT

A palletizing device for container packs including a structure and a loading surface of the packs with side-by-side parallel rollers mounted on mobile frames with a freely rotation. Two side parts are movable from a closed position to an open position, and reversely. When a locking system of the rollers with a locking means with a cart with a locker mobile from a folded position to an unfolded position, and reversely, is in the unfolded position, the locker is blocking the freely rotation of the rollers, and the locking system has a fixed locking actuator cooperating with the locking actuator to move the locker from the folded position to the unfolded position to lock the rollers of the two sides parts during the movement from the closed to the opened position. In some examples, displacement of the loading surface can cause the locker to either engage or disengage.

10 Claims, 5 Drawing Sheets

(58) Field of Classification Search
CPC ........ B65G 13/02; B65G 47/54; B65G 13/06; B65G 2812/0352; B65G 13/075; B65G 1/06; B65G 39/00; B65G 47/642; B65G 17/061; B65G 2201/0244; B65G 17/063; B65G 57/035; B65G 19/306; B65G 35/063; B65G 21/22; B65G 25/00; B65G 47/52; B65G 21/2018
See application file for complete search history.

(56) References Cited

U.S. PATENT DOCUMENTS

| | | | | |
|---|---|---|---|---|
| 8,057,155 | B2* | 11/2011 | Germain | B65G 57/24 |
| | | | | 198/750.1 |
| 8,348,591 | B2* | 1/2013 | Perl | B65G 57/005 |
| | | | | 414/789.5 |
| 9,446,917 | B2* | 9/2016 | Oppici | B65G 57/24 |
| 9,676,568 | B2* | 6/2017 | Petrovic | B65G 57/24 |
| 10,138,079 | B2* | 11/2018 | Murarotto | B66C 1/0218 |
| 10,457,502 | B2* | 10/2019 | Morency | B66C 1/32 |
| 11,414,279 | B2* | 8/2022 | Hayes | B65G 59/04 |
| 2011/0076126 | A1* | 3/2011 | Pierson | B65G 57/06 |
| | | | | 414/788.1 |
| 2011/0277423 | A1* | 11/2011 | Magri | B65G 57/06 |
| | | | | 53/147 |
| 2014/0294553 | A1 | 10/2014 | Petrovic | |
| 2016/0280474 | A1* | 9/2016 | De Lama Arenales | B65G 47/086 |

* cited by examiner

PALLETIZING DEVICE OF A SLIDING TABLE WITH ROLLER BLOCKING SYSTEM

CROSS-REFERENCE TO RELATED APPLICATION

This application claims priority to Patent Cooperation Treaty Application No. PCT/EP2022/085560 filed Dec. 13, 2022, which claims priority to European Patent Application No. EP21214143.6 filed Dec. 13, 2021, the entireties of which are incorporated by reference herein.

TECHNICAL FIELD

The invention relates to the domain of industrial line of production of pack of containers.

The term "container" includes an individual object. The container can be of any type, such as a bottle or a flask, or a can. Several containers can be grouped by wrapping or placed into a crate or a box, such as a cardboard box.

A container can be made of any type of material, in particular made of plastic, metal or glass. Depending on its shape and material, a container can be rigid or semi-rigid. Such a container is intended to contain, in a non-exhaustive manner, a fluid, a liquid, powders or granules, in particular of the agrifood or of the cosmetic type. For example, a container can be filled with a beverage type liquid, such as water, juice, soft drink or beer.

As known, within an industrial line, the containers can receive several different successive treatments, such as the manufacture of the container, for example during a plastic injection or stretch-blow molding operation in the case of a plastic bottle. Especially regarding cans, they are made from raw materials, especially a metallic sheet, in particular from an aluminum sheet or a steel sheet, including a stamping process.

The manufacture is followed by filling and then by hermetically sealing, especially through closing with a cap. A labeling step can be applied on the container before or after filling and sealing. At the end of these treatments, the containers are said to be "final".

In view of their handling and transport, such final containers undergo packaging, especially batch packaging, each batch of containers comprising a group of several containers, usually into a square matrix configuration. For example, a usual batch of containers, such as bottles, groups together six containers in two rows and three columns. Then one or more batches of containers are hold together in order to form a pack.

Depending on the pack format, the grouped containers are tied together, wrapped with a plastic or paper sheet, or cased into a box, such as a cardboard crate. Especially one crate can receive several stages of containers, directly overlayed or separated by an inner layer, like a cardboard sheet.

Finally for their manutention and their transport, usually on a pallet, the container packs are stacked, eventually with a layer between each stage, such as a sheet or a tray made of a cardboard or of a plastic material. Such stacking operation is so-called "palletizing".

During the palletizing, several packs of containers are deposited on the pallet as a first stage or on a layer as an upper stage, until to the last top stage. The numbers of packs and of stages depend on the format and number of containers per pack, regarding the dimensions of the pallet.

Such palletizing can be operated through a dedicated device, also called a "sliding table".

BACKGROUND ART

A known palletizing device of a sliding table type, comprises a structure with a loading surface. The structure is raised and dimensioned to be suitable to below receive a pallet under the loading surface. Moreover, the loading surface is horizontally supplied with several packs by one supply side from the downstream line, especially from the last packaging machine, such as a wrapper.

Such sliding table is able to simultaneously unload all the packs supplied on the loading surface to the corresponding stage located below the structure. Such unload step is operated by depositing the packs downwardly, by fast controlling a fall of the packs only under the effect of gravity.

Therefore, first, the loading surface comprises several side-by-side rollers. The rollers are extending horizontally, being parallel one to each other. Moreover, two ends of each of the rollers are mounted on a frame of the structure in a freely rotation (i.e. the rollers are not motorized). So the loading surface is a rolling surface, allowing packs to move by laterally sliding when then are supplied until to fill the loading surface, then to avoid movement of the packs when unloading, by limiting friction of the bottom of the packs on the rollers.

Especially when unloading, the sliding table is opened. Therefore, the loading surface comprises two side parts, being motorized in opposite directions from a closed position to an opened position of the sliding table, and reversely. In the closed position, the loading surface can be supplied by packs. While quickly passing from the closed position until to reach to the open position by spreading the two side parts one from each other, the packs vertically fall to form the last top layer on the pallet.

It is to be noticed that the speed of the opening movement of the two side parts is very fast, in order to allow a vertical drop of the packs while maintaining the raised vertical position. Thus the frames, which are supporting the roller ends, are mobile in a lateral direction, in order to manage an opening suitable to drop all of the packs previously supplied on the loading surface. The mobility of each the frames is obtained by a motorized belt, so that all of the rollers laterally move together when opening or closing the loading surface.

A problem of such sliding table resides in that the free rotation of the rollers creates some unvoluntary displacements of the packs when supplying the loading surface. Especially the packs located at the periphery can horizontally and inwardly be moved. Such inward uncontrolled movement especially happens when the packs are disposed into a specific configuration, wherein there is a hole in the middle of the layers. Such inward movement of the packs is not required, in order to keep a better structured maintain of each of the layers of packs above each other, and also of the finale entire stacked pallet.

In order to limit the length of the displacements, stoppers are placed around the loading surface, such as horizontal bars or walls. So, when supplying the loading surface, the packs block against the stoppers. When unloading, removable stoppers are temporarily placed on the side of the supply side, in order to avoid a displacement of the packs out of the loading surface.

Moreover in order to replace backward the packs which were previously unvoluntary moved when supplying the loading surface, some of the rollers are locked when opening the loading surface. So, when passing from closed to opened position, some of the rollers cannot rotate anymore. Thenceforth the lateral opening movement in the opposite directions of the two side parts of the loading surface, with locked roller, moves back the packs which are laying on the rollers, including the locked roller, until the packs are moved against the stoppers, including the removable stopper.

According to a known sliding table, the locking of some of the rollers is mechanically operated by a flat plate, which is placed in contact against the surface of some of the rollers into a locking position.

SUMMARY OF INVENTION

The invention improves a palletizing device of a sliding table type, with a locking system of the rollers during the opening phase.

Therefore, the locking system comprises a dedicated and combined movement to continuously operate a blocking of the rotation of some of the rollers during the opening of the sliding table.

According to the invention comprises, the palletizing device of container packs, being of a sliding table type, comprises
- a structure, the structure comprising mobile frames motorized along said structure,
- a loading surface of the container packs,
- the structure supporting the loading surface,
- the loading surface comprising side-by-side parallel rollers, two ends of the rollers being mounted on the frames according to a freely rotation,
- the loading surface further comprising two side parts, made of the rollers,
- the two side parts being movable along a stroke into opposite directions from a closed position to an opened position, and reversely, thanks to the movement of the mobile frames along the structure.

The palletizing device is characterized in that the structure further comprises:
- a locking system of at least one of the rollers of each of the two side parts,
- the locking system comprising,
- i) a locking means with a cart jointly mobile with the frames, the locking means comprising a locker, the locker being supported by the cart and being mobile from a folded position to an unfolded position, and reversely,
- in the unfolded position, the locker being in contact with the at least one of the rollers and blocking the freely rotation.

The palletizing device is also characterized in that the locking system further comprising
- ii) a locking actuator, mounted fixed on the structure, along the stroke of the two side parts, the locking means cooperating with the locking actuator to move the locker from the folded position to the unfolded position to lock the at least one of the rollers of the two sides parts during the movement of the corresponding of the two side parts from the closed to the opened position.

According to an embodiment, the locking actuator is configured as a cam with a shape to continuously cooperate with the locker, the cam shape being designed:
- j) to move and maintain the locker into the folded position, when the two side parts are in the closed position,
- jj) to move the locker from the folded position till reaching the unfolded position, during the movement of the corresponding of the two side parts from the closed to the opened position,
- and reversely.

According to an embodiment, the locking means comprises a wheel linked to the locker, the wheel being movable vertically and jointly with the locker, the wheel freely rolling along the cam shape of the locking actuator.

According to an embodiment, the locker comprises at least one module with at least one housing, the at least one housing inwardly comprising a piston with a distal head with a material configured to avoid the free rotation of the corresponding of the at least one of the rollers when in contact in the unfolded position of the locker.

According to an embodiment, the material is a magnetic or an electro-magnetic material.

According to an embodiment, the material is made of plastic, composite or rubber.

According to an embodiment, the at least one module of the locker comprises three housings.

According to an embodiment, the locking means further comprises an elastic repelling means of the locker from the folded position to the unfolded position.

According to an embodiment, the elastic repelling means comprises at least one compression spring.

According to an embodiment, the palletizing device further comprises
- a motorization means of the frames along the structure,
- a displacement means of the cart of the locking means,
- the motorization means being of an endless belt type,
- the displacement means comprising a fixation jaw on the endless belt, the jaw being linked to the cart.

BRIEF DESCRIPTION OF THE DRAWINGS

The invention can be better understood on reading the following description given merely by way of example and with reference to the accompanying drawings, in which.

DESCRIPTION OF EMBODIMENTS

The invention relates to the domain of industrial line of production of pack 1 of containers.

As previously mentioned, the containers can be of any type, especially of a can type, such as visible on the examples shown in FIGS. 8 to 13.

The packs 1 can also be made of a group of containers, so-called batch, wrapped with a plastic or paper sheet, or cased into a box, such as a cardboard crates.

For their manutention and the transport of the packs 1, the packs 1 are stacked into several stages or levels on a pallet 100. Such stacking operation is operated during a palletizing process and achieved through a palletizing device 2.

Such palletizing device 2 is located downstream the production line, after a packaging unit, eventually after a grouping or a stocking unit of containers into packs.

The invention relates to the palletizing device 2 of container packs 1, the palletizing device 2 being of a sliding table type.

Such palletizing device 2 comprises a structure 3. The structure 3 is made of beams and plates, supporting the palletizing device 2 on the ground, especially as a ground base.

The palletizing device 2 further comprises a loading surface 4 of the container packs 1. The loading surface 4 is supported by the structure 3. The loading surface 4 extends horizontally or almost horizontally. The loading surface 4 is intended to receive the packs 1, The packs 1 resting on their bottom on the top of the loading surface 4. Moreover, the packs 1 are laterally supplied from one side of the palletizing device 2.

Therefore, the palletizing device 2 is supplied by a conveyor 5, laterally delivering the packs 1 to the loading surface 4. So, the top surface of the conveyor 5 extends in the same or almost the same horizontal plane that the top of the loading surface 4.

Moreover the conveyor 5 can be of any type, especially of an endless belt type. An example of the conveyor 5 is partially shown in FIGS. 8 to 13.

So, the conveyor 5 delivers several packs 1, with a side lateral movement, in order to fill the loading surface 4. In order to allow the movement of the packs 1 from the conveyor 5 on the loading surface 4, till completely transferal of the packs 1, the loading surface 4 comprising side-by-side parallel rollers 6. Moreover, the rollers 6 are mounted in a freely rotation way, relative to the structure 3. In other words, the rollers 6 are located parallel to each other, as close as possible depending on the diameter of said rollers 6, up to the necessary space allowing their rotation. Also the rollers 6 can freely turn along a clockwise or counter-clockwise direction.

Figure 8:
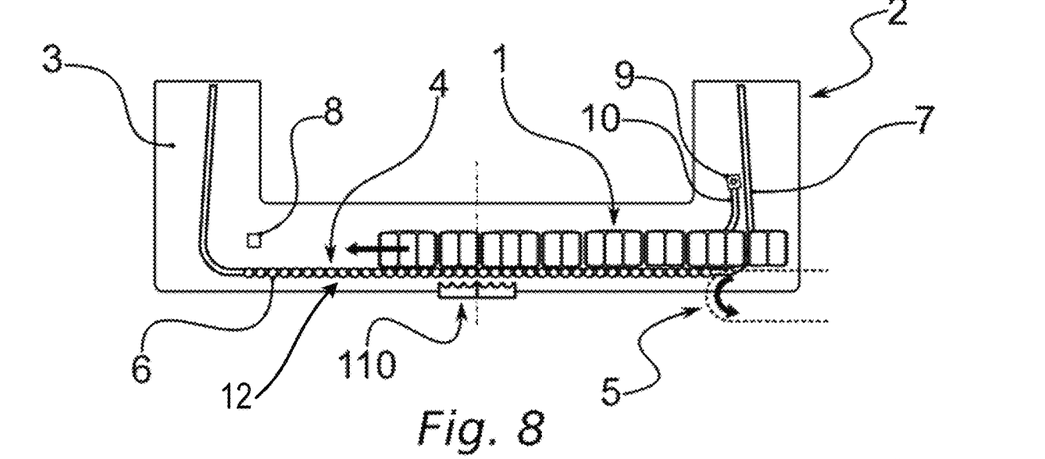
FIG. 8 is a global section view of the palletizing device into the closed position, especially showing a first step of supplying the container packs on the loading surface, the containers being of a can type.

It is to be noticed that the longitudinal axis of the rollers 6 extend along an orthogonal direction, regarding the supply direction from the conveyor 5, so that the packs 1 delivered by the conveyor 5 can roll on the loading surface 4, such as visible on the FIG. 8.

In order to unload the loading surface 4, the loading surface 4 further comprising two side parts, made of the rollers 6. So, the loading surface 4 is divided into a left side part and a right side part. Moreover, the two side parts are movable along a stroke into opposite directions from a closed position to an opened position, and reversely. Especially the movement of the two side parts is jointly operated, the two side parts opening and closing symmetrically or almost symmetrically. So, the opening of the loading surface 4 is obtained by spacing and separating the two side parts, and reversely the closing is obtained by bringing together and closer the two side parts.

Therefore, the structure 3 supporting the loading surface 4 further comprises mobile frames 12 motorized along said structure 3. Also two ends of the rollers 6 are mounted on the frames (still according to a freely rotation).

It is to be noticed that only some of the rollers 6 can be mounted on the mobile frames 12, especially the rollers 6 located in the middle area of the loading surface 4, from either side of the separation between the two side parts. The other rollers 6 (i.e. not mounted on the frames) are engaged along guiding frames 7.

According to an embodiment, not shown, the guiding frames 7 extend horizontally or almost horizontally.

Figure 1:
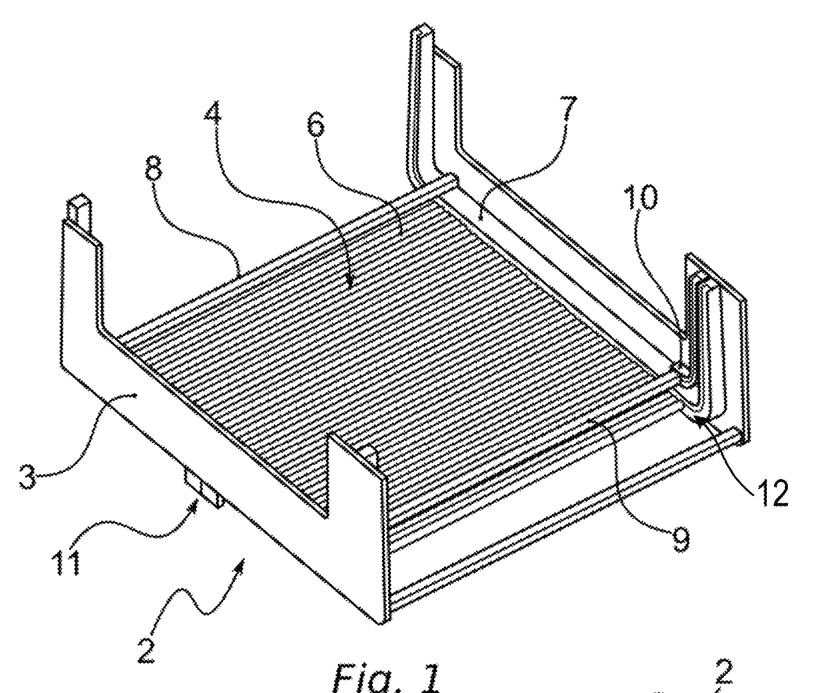
FIG. 1 is a perspective view of an embodiment of a palletizing device of a sliding table type, especially showing the loading surface into a closed position.
Figure 2:
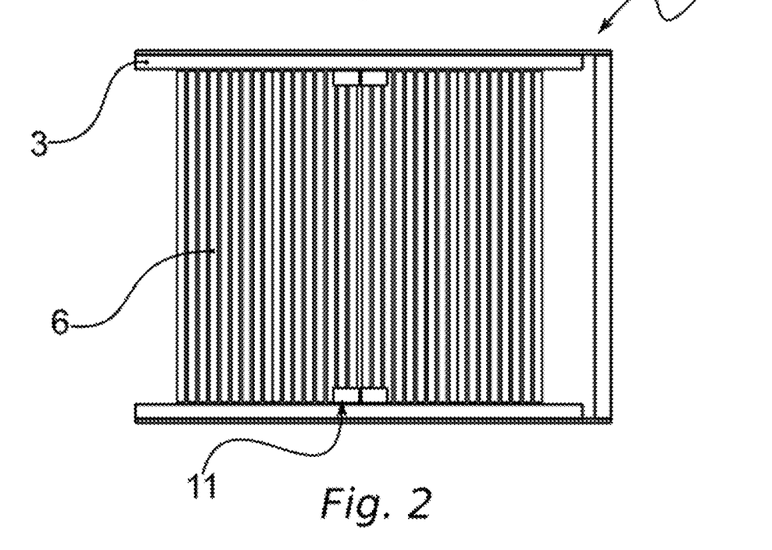
FIG. 2 is a bottom view of FIG. 1, especially showing the locking system.

According to a preferred embodiment, such as visible in FIG. 1, and especially FIGS. 8 to 13, the guiding frames 7 extend first horizontally in a middle area and along a distance allowing the required dimension of the loading surface 4 to receive the corresponding number of packs 1 to be palletized. Then the guiding frames 7 extends along a curvature from horizontally to vertically, and then upwardly. So when opening the loading surface 4, each of the two side parts are moving laterally, separating from each other from the middle of the loading surface 4 through the movement of the frames, while the rollers 6 located at the opposite are pushed, following the guiding frames 7 along the curvature portion and the vertical portion. Reversely, when closing, the frames are coming back to each other, while the opposite rollers 6 are moved downwardly along the vertical portion and then along the curvature portion, till all come back to the horizontal portion.

It is to be noticed that the palletizing device 2 comprises at least one corresponding motorization means, to allow the controlled movements of the different mobile part of the palletizing device 2. Especially the palletizing device 2 comprises a motorization means of the frames along the structure 3. The motorization means can be of any type, especially of an endless belt type.

So the frames are moved thanks to the motorization means and, as the frames are supporting at least the middle rollers 6 of each of the two side parts, the frames pushes the other rollers 6 along the guiding frames 7.

So the opening and closing of the loading surface 4 is operated thanks to the movement of the mobile frames 12 along the structure 3, and also allowing the rollers 6 to freely turn relative to the frame and/or relative to the guiding frames 7, so relative to the structure 3.

Thenceforth the opening of the loading surface 4 allows the packs 1 resting on the rollers 6 to be vertically dropped, only under the effect of gravity.

It is to be noticed that at least the speed of the motorization for opening is fast enough to avoid and limit the lateral movements of the packs 1 to be dropped, especially to avoid the packs 1 to toggle during their fall (i.e. to keep their horizontal or almost horizontal configuration).

As aforementioned, considering the supply of the loading surface 4, in order to limit the length of the displacements of the supplied packs 1, stoppers are placed around the loading surface 4, such as horizontal bars or walls. So, when supplying the loading surface, the packs 1 block against the stoppers.

Especially a fixed stopper 8 is mounted on the structure 3 and located at the opposite side relative to the supply side. The fixed stopper 8 extends parallel regarding the length of the rollers 6, located above the loading surface 4. So, when supplying the loading surface 4, the packs 1 roll till being stopped against the fixed stopper 8.

Another movable stopper 9 is located at the supply side and also extends parallel regarding the length of the rollers 6, located above the loading surface 4. Moreover, the movable stopper 9 is motorized to move from a retracted upward position to a deployed downward position, and reversely. FIG. 8 especially shows the movable stopper 9 in the retracted upward position, allowing the supply of packs 1 by and from the conveyor 5.

Figure 9:
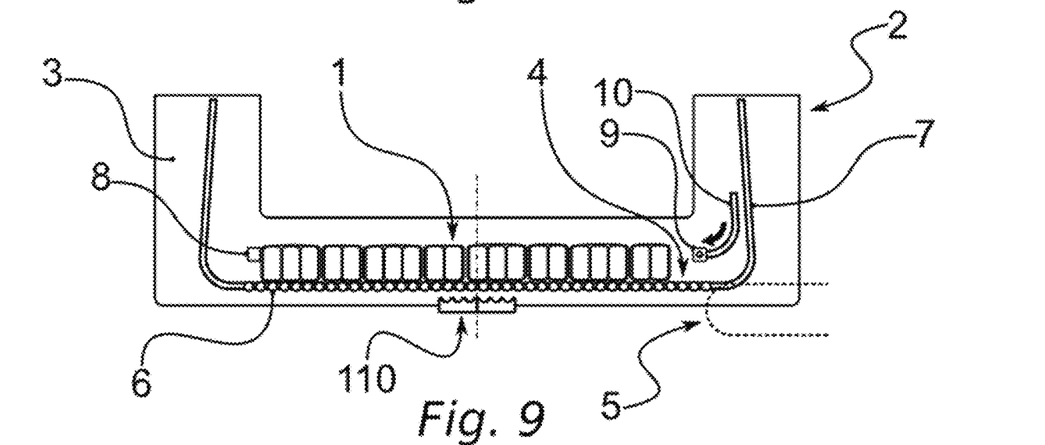
FIG. 9 is a similar view of FIG. 8, especially showing a second step of moving down the movable stopper.

In the retracted position, the mobile stopper 9 is located over the loading surface 4, at an height sufficient to allow the free passage of the packs 1 when supplied from the conveyor 5. FIG. 9 shows the movable stopper 9 downwardly moving from the retracted upward position till reaching the deployed downward position.

Figure 10:
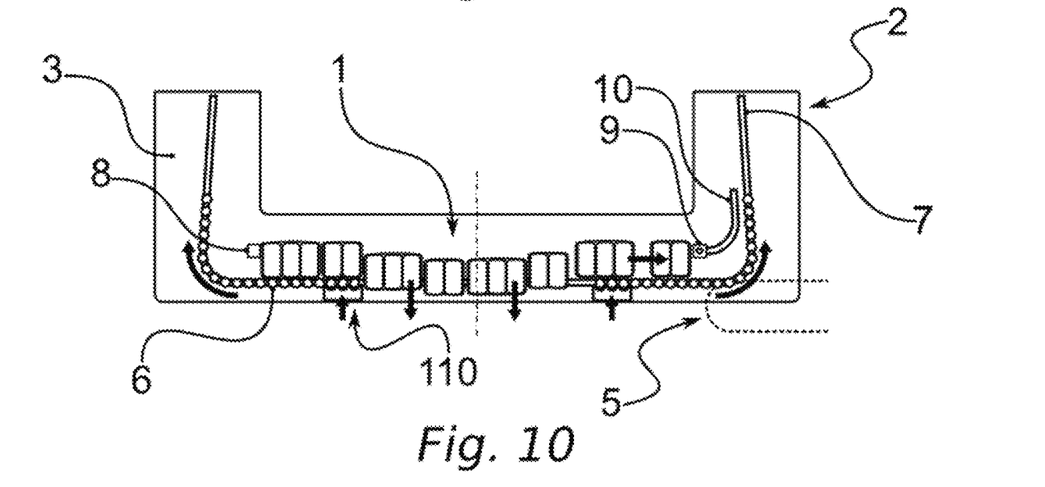
FIG. 10 is a similar view of FIG. 8, especially showing a third step when beginning to move the rollers from the closed position to the opened position, with the drops of centered container packs, wherein the locker is moved into the unfolded/deployed position to block some of said rollers and move lateral container packs till blocking against the movable stopper.
Figure 11:
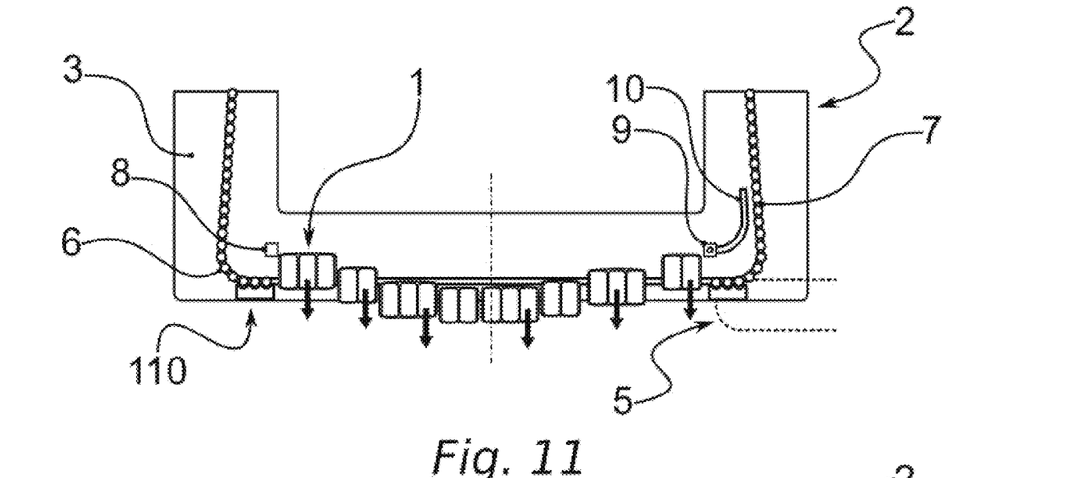
FIG. 11 is a similar view of FIG. 8 of the palletizing device into the opened position, especially showing a fourth step of the drops of the lateral container packs.
Figure 12:
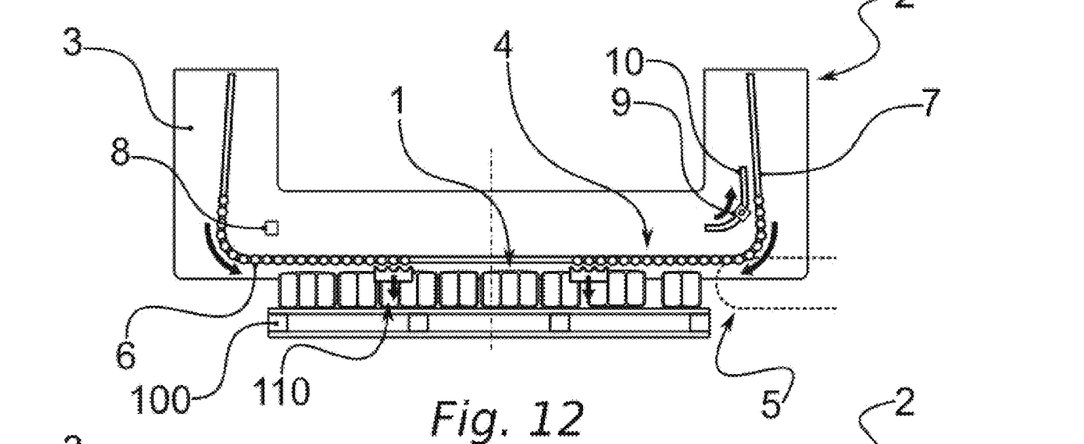
FIG. 12 is a similar view of FIG. 8, especially showing a fifth step when passing from the opened position to the closed position, wherein the locker is moved back into the folded/retracted position.
Figure 13:
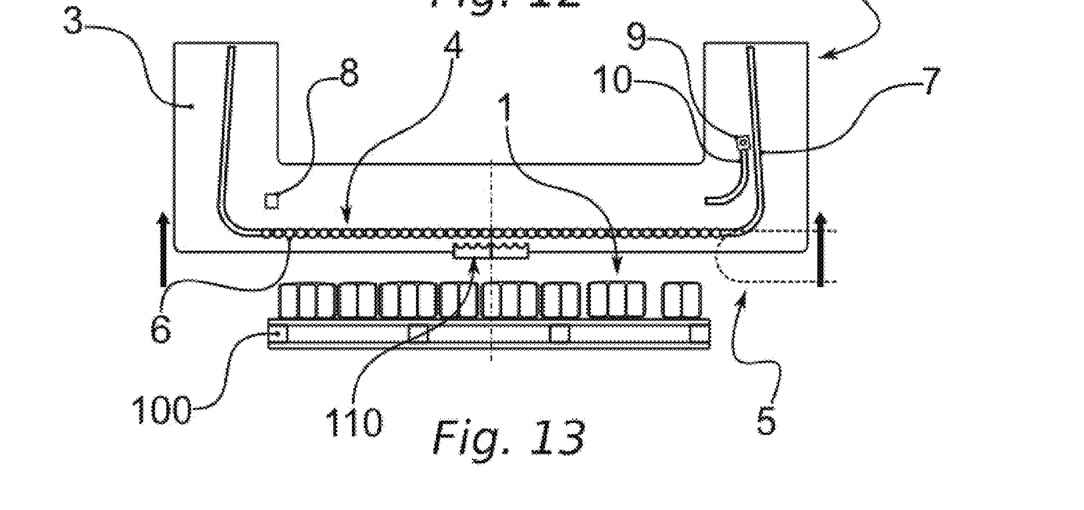
FIG. 13 is a similar view of FIG. 8, especially showing a sixth step into the closed position, wherein palletizing device is moved vertically.

In the deployed position, the movable stopper 9 is downwardly moved till blocking the supply side, avoiding any packs 1 to be supplied from said conveyor 5. Moreover, in the deployed position, the movable stopper 9 avoid any packs 1 located on the loading surface 4 to move outside. Especially when opening the loading surface 4, the movable stopper 9 in the deployed position blocks the packs 1 which are eventually being moved due to the movement of the corresponding of the side parts. FIG. 10 shows the movable stopper 9 in the deployed dowardly position, when opening the loading surface 4, which causes packs 1 to move and be stopped against the inner face of the movable stopper 9.

According to an embodiment, such as shown in FIG. 1, the movable stopper 9 is motorized along slides 10. Such slides 10 extend along or almost along the same directions of the guiding frames 7. Especially the movable stopper g is independently motorized.

The fixed stopper 8 and the movable stopper 9 can be of any type and of any material, especially a bar or a plate, for example made of metal or plastic material. Such a bar is shown on FIG. 1.

Further, in order to replace backward the packs 1 which were previously unvoluntary moved when supplying the loading surface 4, the invention improves a dedicated and combined movement to continuously operate a blocking of the rotation of some of the rollers 6.

Therefore, according to the invention, the structure 3 of the palletizing device 2 further comprises a locking system 11 of at least one of the rollers 6 of each of the two side parts.

In other words, when the locking system 8 is engaged, the free rotation of some of the rollers 6 is stopped. Especially the locking system 11 locked one or several of the rollers 6 located in the middle junction line of the two side parts.

Moreover, according to an embodiment, the locking system 11 locked one or several of the rollers 6 mounted on the mobile frames 12.

Therefore, the locking system 11 first comprises a locking means 110.

It is noticed that, as there are at least two mobile frames, one for each of the two side parts, the locking system 11 comprises identical two locking means 110 which block the rollers 6 of each of said two mobile frames 12.

According to a preferred embodiment, as there are two frames for each of the two ends of the rollers 6 of each of the two side parts, there also are two pairs of the locking means 110 which block the rollers 6 of each of said two mobile frames 12.

Such a locking means 110 is movable. So, the locking means 110 comprises a cart 111, which is jointly mobile with the frames, So the cart 111 is synchronously moved when moving the movable frames when opening and when closing the loading surface 4.

Figure 4:
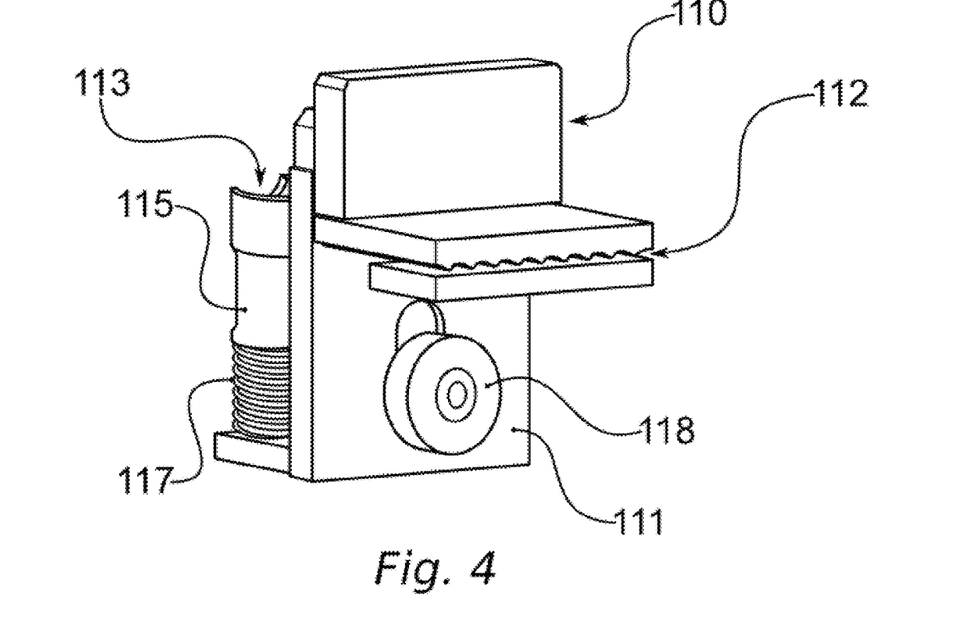
FIG. 4 is a perspective rear view of the locking means with the cart supporting the locker, especially showing a wheel designed to cooperate with the cam of the locking actuator.

As aforementioned, the palletizing device 2 comprises a motorization means of the mobile frames 12 along the structure 3 and the motorization means being of an endless belt type. According to this embodiment, the palletizing device 2 comprises a displacement means of the cart 111 of the locking means 110 and the displacement means comprising a fixation jaw 112 on the endless belt, the jaw 112 being linked to the cart 111. Such a jaw 112 is especially visible in the example of FIG. 4. So, the jaw 112 is placed and fixed to clutch the endless belt both upwardly and dowardly, so that the cart 111 is secured along the endless belt and jointly moved when activating the motorization means, when opening and when closing the loading surface 4.

Moreover, the locking means 110 also comprises a locker 113. The locker 113 is supported by the cart 111 and is mobile from a folded position to an unfolded position, and reversely.

According to a preferred embodiment, in the unfolded position, the locker 113 is in contact with the at least one of the rollers 6 and blocks the freely rotation, Reversely, in the folded position, the locker 113 is not active against the rollers 6, allowing them to freely rotate.

According to another embodiment, not shown, in the folded position, the locker 113 is in contact with the at least one of the rollers 6 and blocks the freely rotation, and reversely.

According to an embodiment, the locker 113 is located under the loading surface 4 and is vertically movable along an upward direction from the folded position to the unfolded position, and reversely along a downward direction from the unfolded to the folded position. Such under locker 113 is visible on the example in FIGS. 5 to 7.

According to another embodiment, not shown, the locker 113 is located over the loading surface 4, acting from above to get in contact and locked the rollers 6 in the unfolded position.

Regarding the number of rollers 6 blocked by the locker 113, according to an embodiment, the locker 113 comprises at least one module with at least one housing 114.

According to a preferred embodiment, the at least one module of the locker 113 comprises three housings 114. Such a module of the locker 113 with three housings 114 is shown in FIG. 3 and also in FIGS. 5 to 7.

Moreover a housing 114 is dedicated to cooperate against the periphery of only one of the rollers 6. So depending of the number of housings 114, the locker 113 blocks the same number of the rollers 6.

Figure 3:
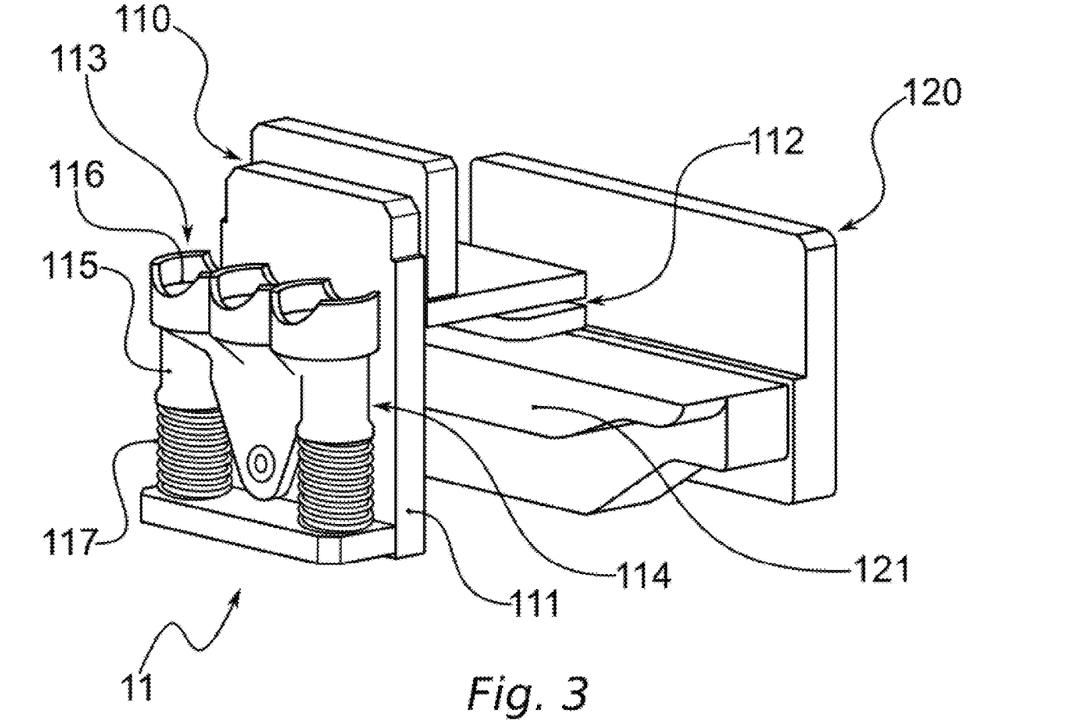
FIG. 3 is a perspective front view of an embodiment of the locking system, especially showing the cam shape of the locking actuator and the cart supporting the locker.
Figure 5:
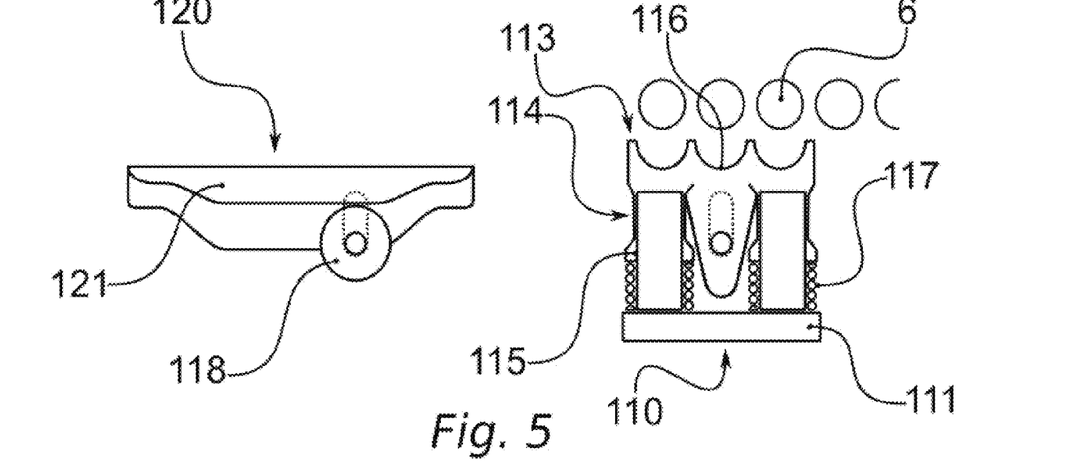
FIG. 5 is a section simplified view of the locking means of the palletizing device into the closed position, especially showing the wheel cooperating along the cam shape of the locking actuator and the locker in the folded/retracted position.
Figure 6:
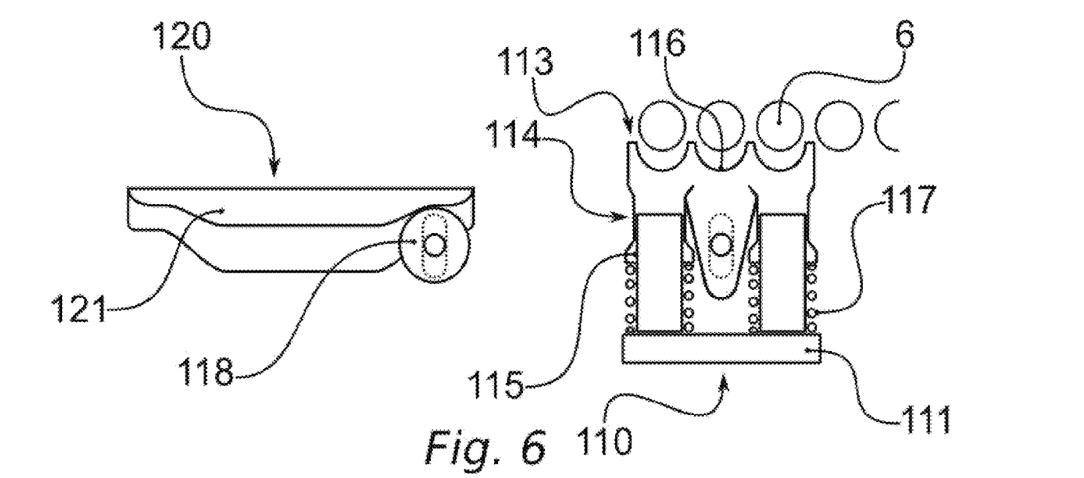
FIG. 6 is a similar view as FIG. 5 of the palletizing device when passing from the closed position to the opened position, especially showing the displacement of the wheel and the locker moved into an intermediate position.
Figure 7:
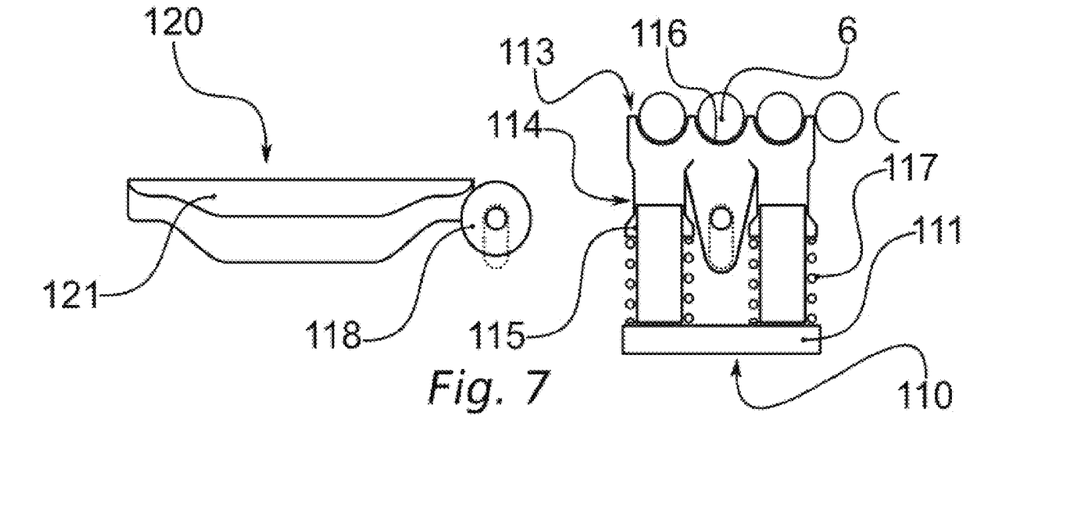
FIG. 7 is a similar view as FIG. 5 of the palletizing device till reaching the opened position, especially showing the locker into the unfolded/deployed position, as the wheel is no more cooperating along the cam shape of the locking actuator.

Therefore, according to an embodiment, the housing 114 is arc shaped in corresponding dimensions regarding the circular cross-section shaped dimensions of the rollers 6, such as visible in FIG. 3 and also in FIGS. 5 to 7.

Also one or several modules, with the desired number of housings 114, can be combined next to each other in order to block the required number of the rollers 6.

Concerning the blocking, according to an embodiment, the at least one housing 114 inwardly comprising a piston 115 with a distal head 116 with a material configured to avoid the free rotation of the corresponding of the at least one of the rollers 6 when in contact in the unfolded position of the locker 113.

According to an embodiment, the material of the distal head 116 is a magnetic or an electro-magnetic material.

According to a preferred embodiment, the material of the distal head 166 is made of plastic, composite or rubber.

Moreover, the movement of the locker 113 from the folded position to the unfolded position is achieved by any type of motorization.

According to a preferred embodiment, the locking means 110 further comprises an elastic repelling means of the locker 113 from the folded position to the unfolded position.

Such repelling means of the locker 113 can be of any type. According to a preferred embodiment, the elastic repelling means comprises at least one compression spring 117.

Such repelling means of a compression spring 117 and its functioning is especially shown in FIGS. 5 to 7.

Alternatively, according to the corresponding embodiment, a dedicated motorization means controls the movement of the locker 113 from the folded position to the unfolded position, or from the unfolded position to the folded position.

Such motorization can be of any type, for example of a mechanical type, an electrical type, or especially a pneumatical type.

According to the invention, the locking system 11 further comprises a locking actuator 120. Such a locking actuator 120 is mounted fixed on the structure 3, along the stroke of two side parts, According to the corresponding embodiment, the locking actuator 120 is mounted along the guiding frames 7.

Moreover the locking means 110 cooperates with the locking actuator 120 to move the locker 113 from the folded position to the unfolded position to lock the at least one of the rollers 6 of the two sides parts during the movement of the corresponding of the two side parts from the closed to the opened position. In other words, the movements of opening and closing the loading surface 4 induce an interaction between the mobile locking means 110 and the fixed locking actuator 120, to move the locker 113 from one to another folded or unfolded position.

According to an embodiment, the locking actuator 120 is configured as a cam 121.

Moreover the cam 121 has a shape to continuously cooperate with the locker 113, the cam shape being first designed to move and maintain the locker 113 into the folded position, when the two side parts are in the closed position, The cam shape is also designed to move the locker 113 from the folded position till reaching the unfolded position, during the movement of the corresponding of the two side parts from the closed to the opened position, Such cam shape design also allows the reversely movements.

According to a preferred embodiment, the shape of the cam 121 extends continuously with a longitudinal path from a thicker portion to a less thick portion. So when the locking means 110 interacts with the thicker portion, the locker 113 is pushed into the folded position, also when the locking means 110 interacts with the less thick portion, the locker 113 is able to move to the unfolded position (due to the corresponding motorization, especially the repelling means, and the vertical liberty of movement of the locker 113 relative to the cart 111).

According to an embodiment, the locking means 110 comprises a wheel 118 linked to the locker 113. Moreover, the wheel 118 is movable vertically and jointly with the locker 113. Also, the wheel 118 is freely rolling along the cam shape of the locking actuator 120.

So first when the wheel 118 rolls along the cam 121, especially along an inclined junction between the less thick portion and the thicker portion, the free rotation of the wheel 118 allows the vertical movement of the locker 113. Depending of the direction of the cart 111, when closing or when opening, the rolling of the wheel 118 along the cam 121 induces the locking when opening or the unlocking when closing of the corresponding rollers 6.

Examples of the rolling movements of the wheel 118 regarding the positions of the locker 113 are shown in FIGS. 5 to 7.

According to this embodiment, the locking actuator 120 has only one cam 121, with a symmetrical shape, acting with both right and left locking means 110 of the two side parts. So the one cam 121 is fixed in the middle junction between the two side parts.

Also depending on the length of the cam 121 (i.e. depending of the length of each of the thicker portion, the less thick portion and eventually the inclined portion) the vertical movement of the locker 113 is modified, in order to lock (or unlock) the corresponding rollers 6 at a different position of the two side parts during the opening (or the closing) of the loading surface 4.

Thereby the palletizing device 2 according to the invention allows a automatic locking of some of the rollers 6 of the loading surface 4, the locking (or unlocking) being controlled continuously during the opening (or closing) of the side parts of the loading surface 4.

It is also very easy, through a mechanical switch, manually or automatically controlled, to lock the locking system 11 into the folded position of the locking means 110, avoiding the locking or unlocking of the rollers 6, if required.

The invention claimed is:
1. A palletizing device for container packs comprising:
  a structure, the structure comprising mobile frames motorized along said structure,
  a loading surface of the container packs,
  the structure supporting the loading surface,
  the loading surface comprising side-by-side parallel rollers, two ends of the rollers being mounted on the frames according to a freely rotation,
  the loading surface further comprising two side parts, made of the rollers,
  the two side parts being movable along a stroke into opposite directions from a closed position to an opened position, and reversely, due to a movement of the mobile frames along the structure,
wherein the structure further comprises:
  a locking system of at least one of the rollers of each of the two side parts,
  the locking system comprising, a locking means with a cart jointly mobile with the frames, the locking means comprising a locker, the locker being supported by the cart and being mobile from a folded position to an unfolded position, and reversely, in the unfolded position, the locker being in contact with the at least one of the rollers and blocking the freely rotation, and wherein the locking system further comprises a locking actuator, mounted fixed on the structure, along the stroke of the two side parts, the locking means cooperating with the locking actuator to move the locker from the folded position to the unfolded position to lock the at least one of the rollers of the two side parts during movement of the corresponding of the two side parts from the closed to the opened position.

2. The palletizing device according to claim 1, wherein the locking actuator is configured as a cam with a shape to continuously cooperate with the locker, the cam shape being designed:
  i) to move and maintain the locker into the folded position, when the two side parts are in the closed position,
  ii) to move the locker from the folded position till reaching the unfolded position, during the movement of the corresponding of the two side parts from the closed to the opened position, and reversely.

3. The palletizing device according to claim 2, wherein the locking means comprises a wheel linked to the locker,
  the wheel being movable vertically and jointly with the locker,
  the wheel freely rolling along the cam shape of the locking actuator.

4. The palletizing device according to according to claim 1, wherein the locker comprises at least one module with at least one housing, the at least one housing inwardly comprising a piston with a distal head with a material configured to avoid the free rotation of the corresponding of the at least one of the rollers when in contact in the unfolded position of the locker.

5. The palletizing device according to claim 4, wherein the material is a magnetic or an electro-magnetic material.

6. The palletizing device according to claim 4, wherein the material is made of plastic, composite or rubber.

7. The palletizing device according to claim 4, wherein at least one module of the locker comprises three housings.

8. The palletizing device according to claim 1, wherein the locking means further comprises
  an elastic repelling means of the locker from the folded position to the unfolded position.

9. The palletizing device according to claim 8 wherein the elastic repelling means comprises at least one compression spring.

10. The palletizing device according to claim 1, further comprising
  a motorization means of the frames along the structure,
  a displacement means of the cart of the locking means,
  the motorization means being of an endless belt type,
  the displacement means comprising a fixation jaw on the endless belt, the jaw being linked to the cart.

* * * * *